March 22, 1927.  J. CULELL  1,621,526
CALIPER
Filed Sept. 14, 1923    2 Sheets-Sheet 1
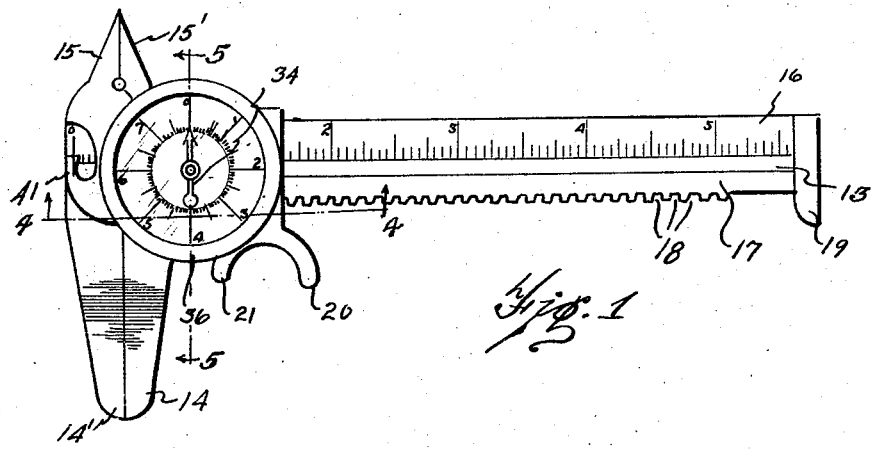
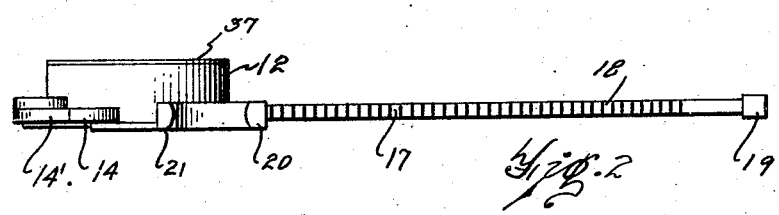
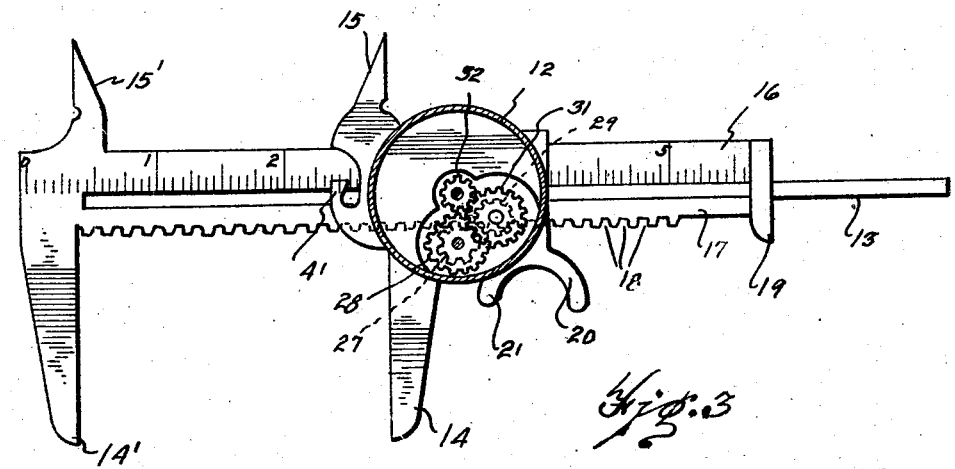
INVENTOR.
John Culell
BY
ATTORNEY.

March 22, 1927.

J. CULELL 1,621,526

CALIPER

Filed Sept. 14, 1923   2 Sheets-Sheet 2

INVENTOR.
John Culell
BY Thos. Donnelly
ATTORNEY.

Patented Mar. 22, 1927.

1,621,526

UNITED STATES PATENT OFFICE.

JOHN CULELL, OF DETROIT, MICHIGAN.

CALIPER.

Application filed September 14, 1923. Serial No. 662,619.

My invention relates to a new and useful improvement in a caliper and has for its object the provision of a caliper capable of measuring internal and external diameters and provided with an amplifying measuring device for indicating the various degrees of measurement.

Another object of the invention is the provision of a caliper having a graduated scale surface cooperating with an indicator which is operated by a rack and pinion mounted on a shank provided with a cooperating rack.

Another object of the invention is the provision of a caliper having a scale on a slide and an additional scale operated upon the opening or closing of said calipers to indicate fractions of measurements on said slide scale.

Other objects will appear hereinafter.

The invention consists in the combinations and arrangements of parts hereinafter described and claimed.

Figure 4:
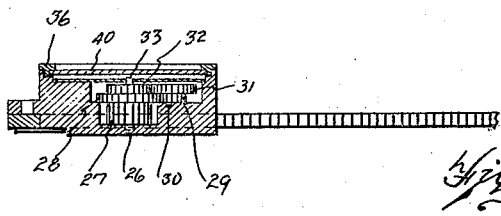
Figure 5:
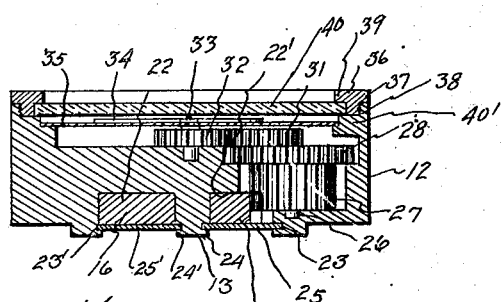
Figure 7:
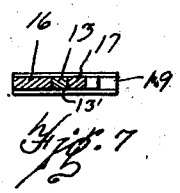
Figure 6:
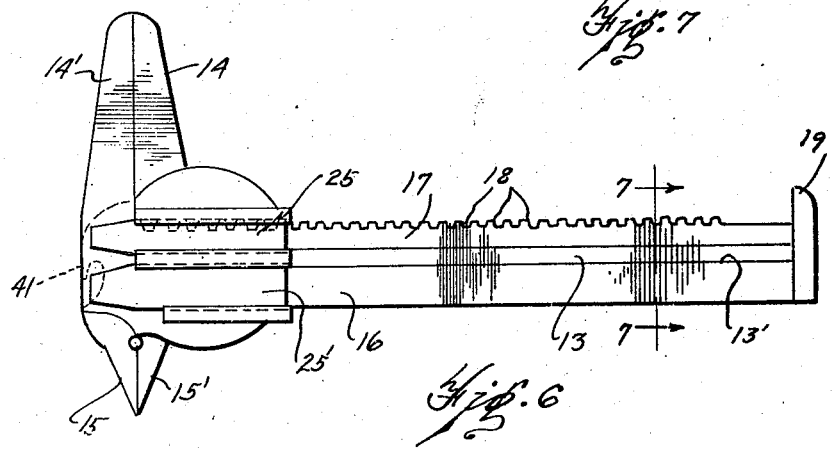

The invention will be best understood from a reference to the accompanying drawings which form a part of this specification and in which, Fig. 1 is a top plan view of the invention, Fig. 2 is a side elevational view of the invention, Fig. 3 is a top plan view of the invention partly open and with parts removed, Fig. 4 is a sectional view taken on substantially line 4—4 of Fig. 1, Fig. 5 is a sectional view taken on line 5—5 of Fig. 1, Fig. 6 is a bottom plan view of the invention, and Fig. 7 is a sectional view taken on substantially line 7—7 of Fig. 6.

The invention in its preferred form comprises a housing 12 projecting from which, and integral therewith, is a stem 13. Projecting from one side of the housing is an arm 14 which is adapted for measuring the external diameter of work pieces and the like. Projecting from the opposite side of the housing is an arm 15 which is adapted for measuring internal bores and the like. An arm 15' is provided for co-operating with the arm 15 and an arm 14' is provided for co-operating with the arm 14. Extending from these arms 14' and 15' is a bar 16 which is provided on one surface with a graduated scale. A bar 17, which is spaced from the bar 16 by the space 13' extends from the arms also and is connected at the free end with the bar 16 by means of a cross piece, a portion 19 of which projects beyond the outer edge of the member 17. Mounted on the housing 12 is a fingerhold 20, having a stop 21 formed thereon, the same being formed arcuate to facilitate the movement of the member 12 and the member 13 relatively to the members 16 and 17.

Formed in the base of the housing 12 are recesses 22 and 22'. The member 16 is adapted for slidable movement in the recess 22 and the member 17 is adapted for slidable movement in the recess 22', said recesses being separated by a continuation of the member 13. Formed in the housing is a recess 23 in alignment with a recess 24 formed in the member 13. A leaf spring which is normally arcuate is adapted for insertion into the recesses 23 and 24, this leaf spring 25 being adapted to resist the slidable movement of the member 17 relatively to the housing 12 because of its being flexed into a straight condition from its normally arcuate form. Formed in the opposite side of the member 13 is a recess 24' in alignment with which is a recess 23' formed in the housing 12. A similar lead spring 25' is adapted to engage in these recesses 24' and 23' for the purpose of resisting the slidable movement of the members 16 relatively to the housing 12. These springs do not prevent the slidable movement of the housing 12 relatively to the members 16 and 17 but serve to resist this slidable movement merely through friction.

Mounted on a shaft 26 journalled in a recess formed in the base of the housing 12 is a gear wheel 27 adapted for meshing with the rack bar 17. Geared on the upper surface of the wheel 27 is a larger gear 28 fixedly attached thereto and adapted to rotate therewith. The gear 28 is adapted to mesh with a smaller gear 29 which is mounted on a shaft 30 journalled in a recess formed in the housing 12. Fixedly attached to and adapted to rotate with the gear 29 is an enlarged gear 31 which meshes with a gear 32, carrying a shaft 33 which is fixedly attached thereto centrally thereof. Fixedly mounted on the shaft 33 is a pointer 34 adapted to co-operate with a dial 35 which is provided with a scale so divided as to indicate the degrees or distances of separation of the members 14 and 14' and the members 15 and 15' as the housing 12 is moved relatively to the rack bar 17 and the member 16. Threaded into the upper portion of the housing 12 is a ring 36 having a flange 37 adapted to engage the upper surface of the housing 12. Member 36 is also provided with an inwardly projecting flange 39 adapted to rest upon the upper surface of a glass disc 40 which is positioned over the indicating dial and the indicating pointer 34, a suitable shoulder 40' being provided for supporting the glass.

Formed on the member 16 is a graduated scale co-operating with which is an indicating member 41 provided with a line or marker formed thereon. Upon withdrawing the members 14 and 14' away from each other, the marker 41 indicates on the scale formed on the member 16 the distance of separation of these members 14 and 14'.

In assembling the device the member 13 is inserted in the space 13' which separates the members 16 and 17, between bifurcations of the member 19 which lie on opposite sides of the members 16 and 17 as shown in Fig. 7. The springs 25 and 25' are then inserted in position in their respective grooves already described.

In using the device, the members 14 and 14', or 15 and 15', are placed in operative position relatively to the work piece to be measured and the housing 12 is then moved relatively to the members 16 and 17. The marker 41 will then indicate on the scale formed on the member 16, the distance measured while the indicating pointer 34 will show minor divisions of the distance. By mounting the pointer 34 in the manner indicated, it is clear that through the gearing used the indicator may be used for measuring very small dimensions up to one hundred thousandths of an inch. In using the members 15 and 15' internal diameters may be measured and in using the members 14 lineal dimensions may be measured for external diameters.

While I have illustrated and described the preferred form of construction, I do not wish to limit myself to the precise details of structure shown in the drawings but desire to avail myself of such variations and modifications as come within the scope of the appended claims.

Having thus described my invention what I claim as new and desire to secure by Letters Patent is:

1. A measuring device of the class described comprising an elongated bar having teeth formed on one longitudinal edge thereof, said elongated bar being provided with a slot extending longitudinally thereof; a pair of engaging fingers each projecting from the opposite longitudinal edges of said bar adjacent one end thereof; a bar slidably mounted in said slot; a pair of fingers projecting from the opposite longitudinal edges of said slidably mounted bar; the fingers on the respective sides of said bars being adapted for cooperating for engaging material to be measured; a housing carried by the said slidably mounted bar, said housing having a plurality of recesses formed therein; a plurality of gears mounted in said recesses in operative relation one of said gears being adapted for engaging the teeth on the edge of the said pair; a dial carried by said housing; a pointer connected to one of said gears and adapted upon the movement of said slidably mounted bar relatively to the other bar for indicating on said dial the distance of movements.

2. In a measuring device of the class described a pair of bars laterally spaced from each other and in the same plane; rack teeth formed on one longitudinal edge of one of said bars; a pair of engaging members, one engaging member projecting from the outer longitudinal edge on each of said bars adjacent one end thereof; a housing provided with a pair of recesses, slidably mounted on said bars; engaging members projecting from opposite sides of said housing and being in alignment with the respective engaging member projecting from said bars; a stem projecting from said housing and adapted for slidable movement between said bars; resilient means for resisting said slidable movement; a scale bearing dial mounted on said housing; a plurality of gears mounted in said recesses in cooperative relation, one of said gears being in engagement with said rack teeth and a pointer operated by said gears upon movement of said housing relatively to said spaced bars for indicating on said scale bearing dial the distance of movements.

In testimony whereof I have signed the foregoing specification.

JOHN CULELL.